United States Patent [19]

Horansky et al.

[11] Patent Number: 4,823,237
[45] Date of Patent: Apr. 18, 1989

[54] HEADLIGHT DOOR ACTUATING MECHANISM

[75] Inventors: John Horansky, Sterling Heights; John H. Schult, Jr., Royal Oak; Henry J. Kessler, St. Clair Shores, all of Mich.

[73] Assignee: Chrysler Motors Corporation, Highland Park, Mich.

[21] Appl. No.: 228,084

[22] Filed: Aug. 4, 1988

[51] Int. Cl.⁴ .............................................. B60Q 1/00
[52] U.S. Cl. ...................................... 362/64; 362/284
[58] Field of Search ................ 362/64, 65, 66, 80, 362/264, 271, 272, 277, 282, 284, 319, 322, 324, 375, 427, 428; 315/82; 280/152 R; 296/194

[56] References Cited

U.S. PATENT DOCUMENTS

| | | | |
|---|---|---|---|
| 2,324,742 | 7/1948 | Voorhees et al. | 240/7.1 |
| 2,700,725 | 1/1955 | Morphew et al. | 240/7.1 |
| 3,070,687 | 12/1962 | Marchant | 240/7.1 |
| 3,601,594 | 8/1971 | Carbary | 240/7.1 H |
| 4,310,872 | 1/1982 | Lauve | 362/82 |
| 4,630,178 | 12/1986 | Mugford et al. | 362/64 |
| 4,737,893 | 4/1988 | Horansky et al. | 362/64 |

Primary Examiner—Ira S. Lazarus
Assistant Examiner—Sue Hagarman
Attorney, Agent, or Firm—Edward A. Craig

[57] ABSTRACT

A door actuating mechanism is provided for opening and closing of door structures over recessed headlights in a vehicle. The actuating mechanism includes means to cause pivoting of the doors to the open or closed positions and simultaneous sliding of the doors sideways with respect to the opening for the recessed headlights to prevent engagement of the doors with the side edges of the opening during opening and closing of the door.

5 Claims, 2 Drawing Sheets

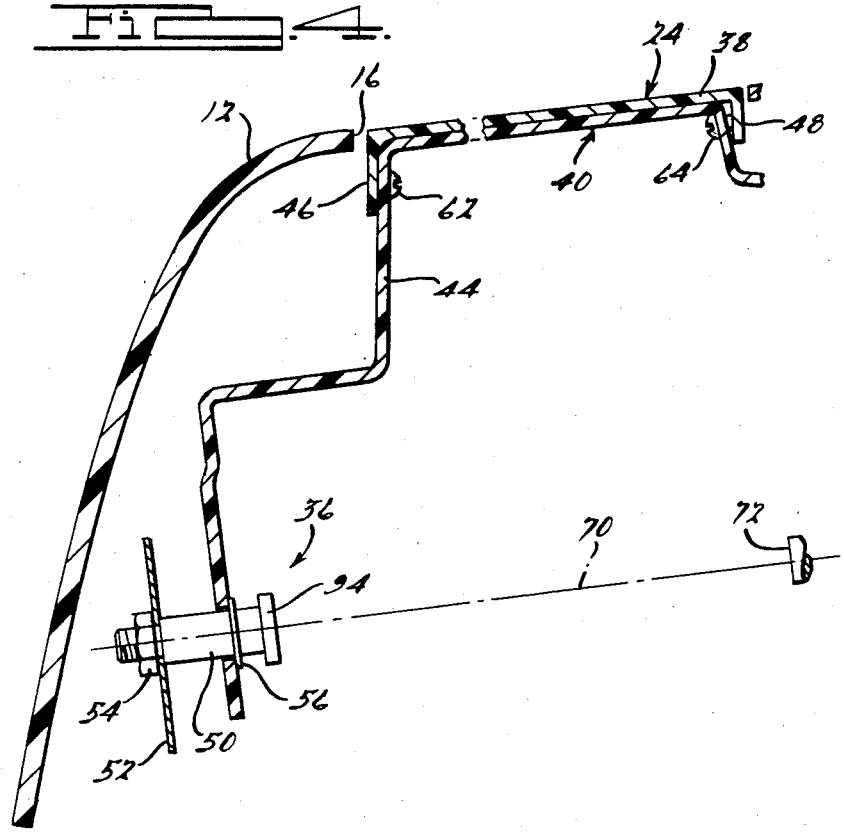
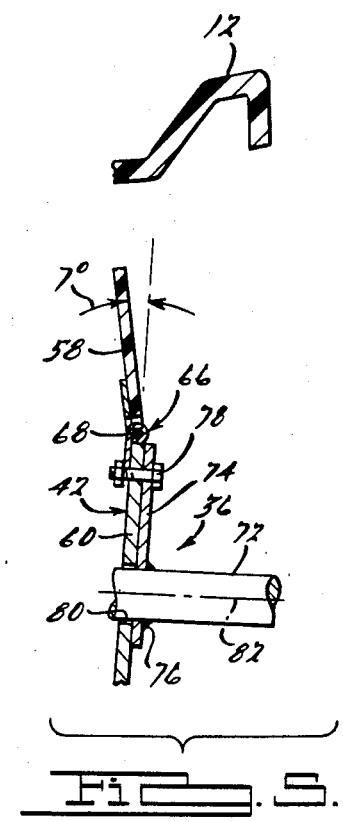
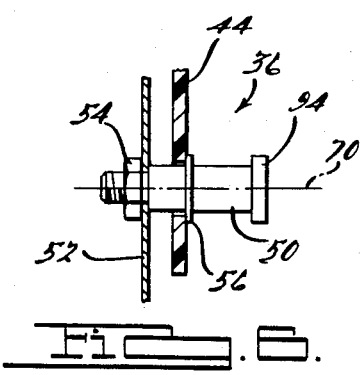
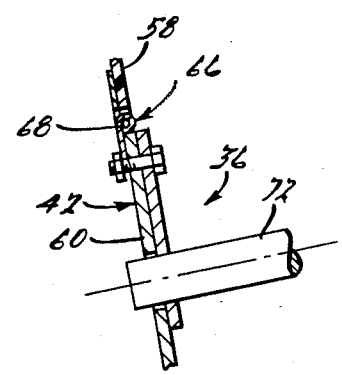
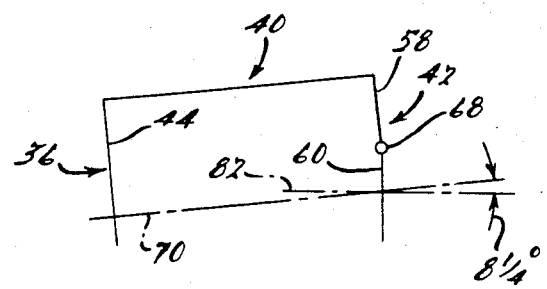
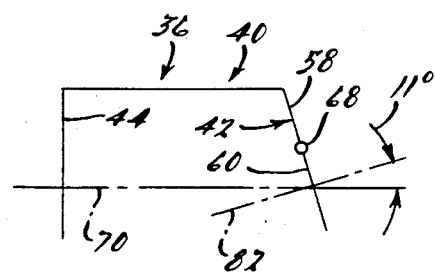

HEADLIGHT DOOR ACTUATING MECHANISM

BACKGROUND OF THE INVENTION

1. Field of the Invention:

The invention relates to a mechanism for actuating the doors covering recessed headlights of a vehicle to open and closed positions.

2. Prior Art:

Mechanisms for operating the doors of recessed vehicle headlamps to open or close have been widely used in the past. Such mechanisms are shown, for example, in U.S. Pat. Nos. 2,324,742, Voorhees, June 20, 1943; 2,700,725, Morphew et al, Jan. 25, 1955; 3,070,687, Marchant, Dec. 25, 1962; and 3,601,594, Carbary, Aug. 24, 1971. The headlight doors shown in these patents have been, broadly, symmetrical about a vertical axis so that it has been possible to open and retract the doors into the headlight recess in a relatively straightforward manner.

However, in the present invention, the headlight door is not symmetrical about a vertical axis. It is desired, from a design standpoint, to provide the door in the form of a non-right angle parallelogram. This has been done for design effect. The headlights are recessed into vehicle panel structure which is angled rearwardly from the front of the vehicle towards the side of the vehicle or, otherwise stated, from an inboard point of the vehicle to an outboard point of the vehicle. This has been done so that when the front end of the vehicle is viewed from the front of the vehicle, the headlamp doors will give the optical illusion of being rectangular. Because of the slant of the panel structure in which the doors are mounted, if the openings were actually rectangular, they would appear to be non-right angle parallelograms when viewed from the front of the vehicle. This is considered to be visually objectionable.

However, as a consequence of this arrangement, the doors are not symmetrical about a vertical axis. This geometry results in making it impossible to retract the doors about an axis which is perpendicular to the side edges of the door and at the same time to fully retract the doors into the recesses. A portion of the doors would always project out of the recesses if the axes of retraction were at right angles to the edges of the doors. On the other hand, if a horizontal axis were chosen, the doors would move in a sideward direction with respect to the side edges of the opening into which they are mounted during the retracting process. This would cause interference of the side edges of the doors with the side edges of the openings as the doors are retracted. In order to solve this problem, in accordance with the present invention, the doors are retracted about a generally horizontal axis so that they will be entirely recessed into the headlamp recesses when they are retracted. But, during the retracting process, the doors are simultaneously moved sidewardly so that they will not interfere with the edges of the openings in which the headlamps are recessed. Structure to accomplish this purpose is disclosed in U.S. Pat. No. 4,737,893, Apr. 12, 1988. The structure disclosed therein is functionally adequate. However, the presently disclosed structure is less expensive to manufacture.

SUMMARY OF THE INVENTION

The headlight door actuating mechanism of the present invention is provided in a vehicle which has front end body panel structure defining a pair of openings. A pair of headlights are recessed in the openings. Each opening is closed by a pivotal door when the headlights are turned off. The doors are pivotable to an open position when the headlights are turned on. The body panel structure includes two sections, each of which is angled rearwardly and outwardly from a point inboard of the outboard side of the vehicle. One of the openings is provided in each of the sections. Each opening is configured in the general shape of a non-right angle parallelogram including non-vertical side edges which appear to be vertical which when viewed from the front of the vehicle.

Inboard and outboard bracket structure extends rearwardly from each respective side edge of the door. A pivot shaft is fixedly secured to the vehicle. The outboard bracket structure is pivotally mounted on the pivot shaft.

The inboard bracket structure comprises first and second portions. The first portion is fixedly attached to the door. Hinge means are provided to pivotally attach the second portion to the first portion. The axis of the hinge means is at substantially right angles to the longitudinal axis of the pivot shaft.

A crank shaft is fixedly attached to the second portion. The longitudinal axis of the crank shaft is angled downwardly, about eight and one-quarter angular degrees, with respect to the longitudinal axis of the pivot shaft in a vertical plane and is angled forwardly with respect thereto, about eleven angular degrees, in a horizontal plane.

Drive means are connected to the crank shaft for selectively rotating the crank shaft to open or close the door in a vertical direction with the door simultaneously pivoting and sliding sideways on the pivot shaft to prevent engagement of the door with the side edges of the opening in the body panel structure during opening and closing of the door. The sideways sliding on the pivot shaft is accompanied by pivoting of the first portion of the inboard bracket structure with respect to the second portion via said hinge means.

The longitudinal axis of the pivot shaft, when theoretically extended, passes through the axis of the crank shaft at substantially the juncture of the second portion of the inboard bracket structure and the crank shaft. The inboard first bracket structure is angled in an outboard direction, about seven angular degrees, with respect to the second portion thereof when the door is in the closed position and is substantially in alignment therewith when the door is in the open position.

BRIEF DESCRIPTION OF THE DRAWINGS

FIG. 4 is sectional view taken substantially along the line 4—4 of FIG. 3 looking in the direction of the arrows;

FIG. 5 is a sectional view taken substantially along the line 5—5 of FIG. 3 looking in the direction of the arrows;

FIG. 6 is a sectional view of the pivot shaft similar to FIG. 4 but in elevation as viewed in front of the vehicle and with the door in the open position;

FIG. 7 is a sectional view figure similar to FIG. 5 but in elevation as viewed from the front of the vehicle and with the door in the open position;

FIG. 8 is a diagrammatic plan view of the door actuating mechanism with the door in the closed position; and FIG. 9 is a diagrammatic elevational view of the door actuating mechanism with the door in the open position.

DETAILED DESCRIPTION OF A PREFERRED EMBODIMENT

Figure 1:
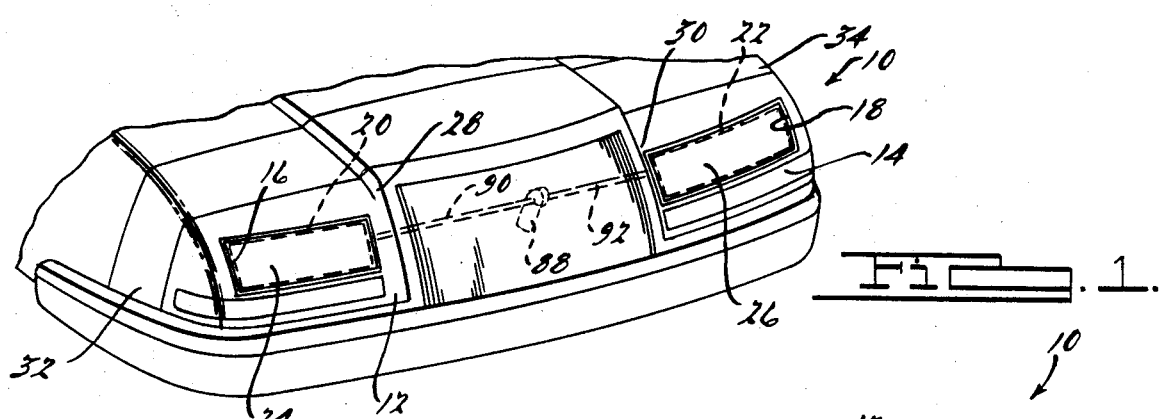
FIG. 1 is a front end view of a vehicle including the recessed headlamps of the present invention.
Figure 2:
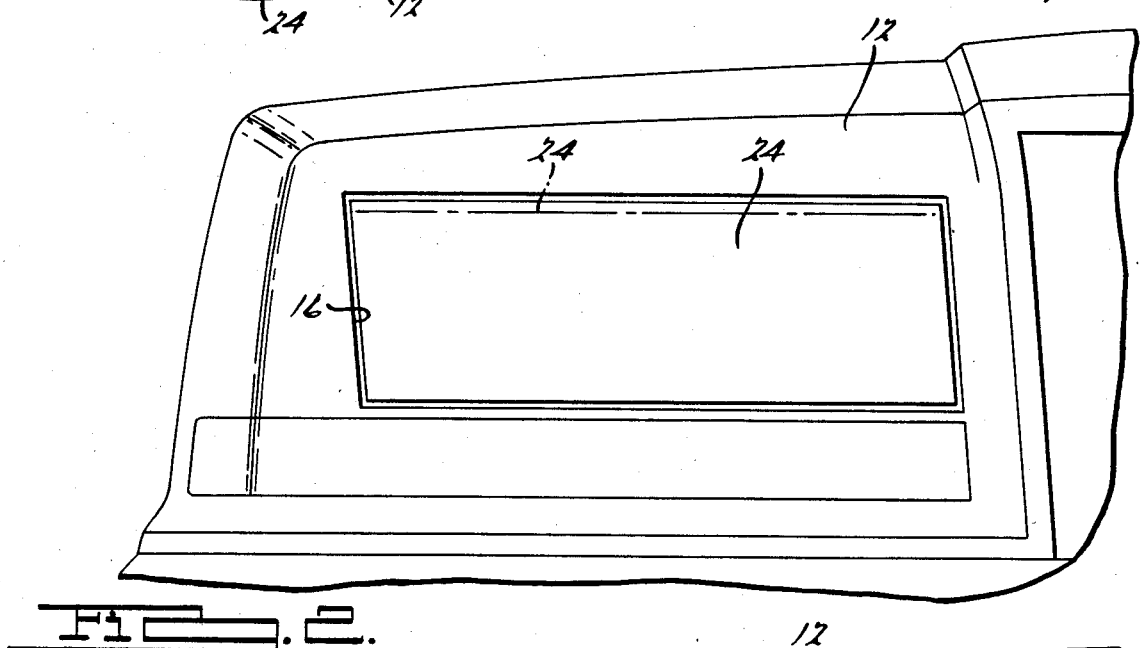
FIG. 2 is a front elevational view of the left side of the vehicle illustrating the visual appearance of the headlight recess and door as viewed from an angle perpendicular to the plane thereof.
Figure 3:
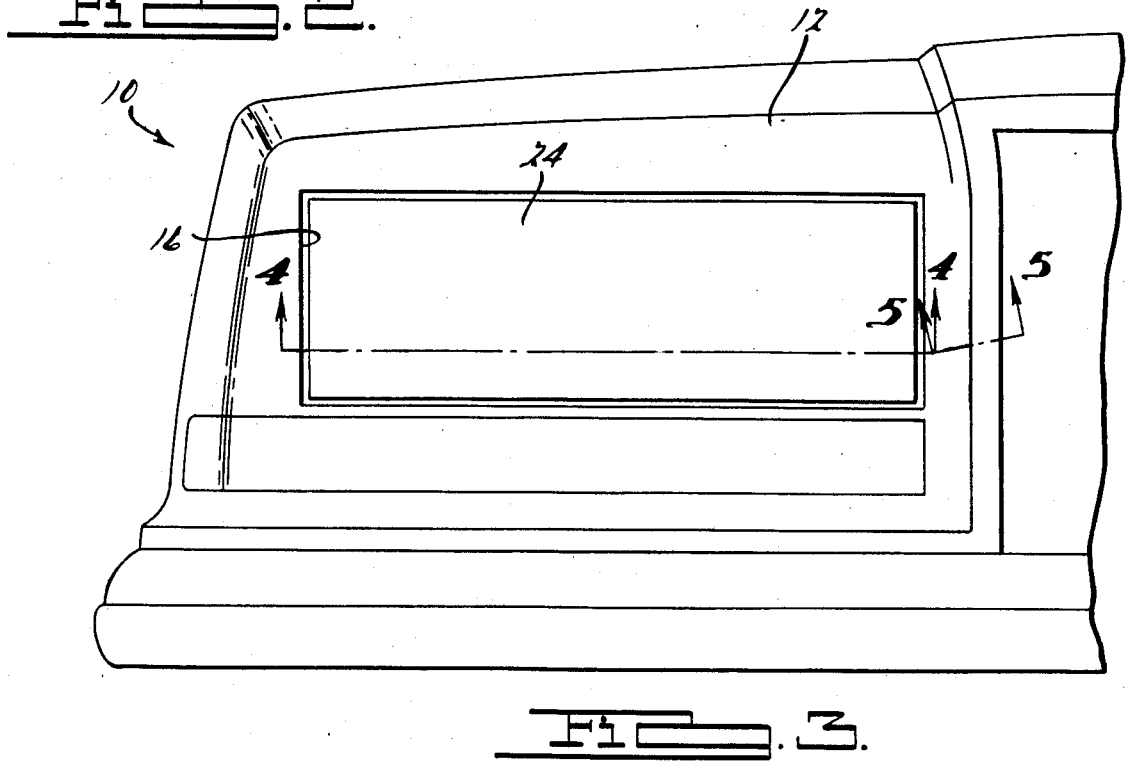
FIG. 3 is a view similar to FIG. 1 illustrating the appearance of the headlight recess as viewed from a position directly in front of the vehicle.

The problem with which the present invention is concerned may best be understood by reference to FIGS. 1-3. As will be noted FIG. 1, a vehicle 10 is provided with front end body panel structure including two sections 12, 14 which define a pair of openings 16, 18. A pair of headlights 20, 22 are recessed in the openings 16, 18. Each opening is closed by means of a pivotable and slidable door 24, 26 when the headlights are turned off. The doors 24, 26 are pivotable and slidable to an open position as shown in dotted line in FIG. 2 when the headlights are turned on.

Each of the sections 12, 14 is angled rearwardly and outwardly from a point 28, 30 inboard of the outboard vehicle sides 32, 34. Each of the openings is configured in the general shape of a non-right angle parallelogram (FIG. 2) including non-vertical side edges which appear to be vertical when viewed from the front of the vehicle as will be noted in FIG. 3. The upper edges of the openings are generally horizontal and appear to be so from all angles. As will be appreciated, if the doors 24, 26 are rotated about an axis which is perpendicular to the side edges, they will be retracted into the recesses without touching the side edges of the openings 16, 18. However, with such an axis of rotation, the lower right edge of the left door, for example, would project out of the recess upon being retracted and this would be visually objectionable. Therefore, it is desired to use an axis of rotation which is parallel to the bottom edge of the doors and openings so that the doors will be uniformly retracted into the recesses. However, in this event, the doors would impinge against the side edges of the openings when they have been pivoted about half-way. Rotation about such an axis will result in interference of the door structure with the side edges of the openings. To overcome this problem, structure is provided to shift the doors sidewardly as they are retracted.

The door actuating mechanism 36 is illustrated in FIGS. 4, 5, 6 and 7. One of these mechanisms is provided for each door. As will be noted, the doors comprise a front closure panel 38 mounted on a bracket 40 which has inboard and outboard structures 42, 44 which extend rearwardly from each respective side edge 46, 48 of the door 24. A pivot shaft 50 is secured to vehicle panel structure 52 by means of a nut 54. A bushing 56 is provided in an opening of the outboard bracket structure 44 to suitable journal the bracket structure on the pivot shaft. The bracket structure 44 is free to slide and rotate on the pivot shaft 50.

The inboard bracket structure 42 comprises first and second portions 58, 60. The first portion 58 is fixedly attached to the bracket 40 and thus to the door panel 38 which is attached to the bracket by means of nut and bolt structures 62, 64.

A hinge 66 pivotally attaches the second portion 60 to the first portion 58. The hinge pin 68, which defines the pivot axis of the hinge, is oriented at substantially right angles, that is, perpendicularly to the longitudinal axis 70 of the pivot shaft 50 so that the first portion 58 can pivot in the direction of axis 70 during opening and closing of the door. With the door 24 in the closed position as shown in FIGS. 4 and 5, the first portion 58 of the inboard bracket structure is angled about seven angular degrees in an outboard direction with respect to the second portion 60. When the door 24 is pivoted to the open position, the first portion 58 is pivoted to a position where it is in substantial alignment with the second portion 60 as shown in FIG. 7.

A crank shaft 72 is fixedly attached to the second portion 60 by means of a link 74 which is welded to the shaft 72 at 76 and a nut and bolt structure 78 which secures the link 74 to the second portion 60. A small portion of the outboard end of the crank shaft 72 extends through an opening 80 in the second portion 60 and terminations a short distance therebeyond. The crank shaft 72 is thus capable of causing the entire door structure to pivot between open and closed positions. As will be noted, both the pivot shaft 50 and crank shaft 72 are oriented at substantially right angles to the inboard and outboard bracket structures 42, 44 at the juncture therewith so that they will rotate in a generally circular motion about the longitudinal axis 70 of the pivot shaft and the longitudinal axis 82 of the crank shaft. As will be noted in FIGS. 4, 8 and 9, the longitudinal axis 70 of the pivot shaft, when theoretically extended, passes through the longitudinal axis 82 of the crank shaft at substantially the juncture of the second portion 60 of the inboard bracket structure and the crank shaft 72. This relationship permits normal pivoting of the door structure from open to closed positions without jamming.

Drive means are provided and are drivingly connected to the crank shaft 72 to open or close the door in a vertical direction with the door simultaneously pivoting and sliding sideways on the pivot shaft 50 to prevent engagement of the door side edges 46, 48 with the side edges of the opening 16. As will be noted in FIG. 1, the drive means takes the form of an electric motor/gearbox mechanism 88. This structure is mounted centrally on the vehicle between the doors 24, 26. The output of the mechanism 88 is connected by a pair of drive members, for example torsion bars, 90, 92. Drive members 90, 92 are connected to the respective crank shafts of the door actuating mechanisms. The electric motor of the mechanism 88 is energized to rotate the members 90, 92 by means of suitable switching structure upon turning the headlights on or off as is well known in the art. Rotation of the members 90, 92 causes rotation of the crank shafts and thus simultaneous pivoting of the doors to the open or closed position.

As previously discussed, the doors must be slid sidewardly during the pivoting action to avoid interference with the openings 16, 18. The angular relationship of the axes 70, 82 comes into play to accomplish this end. As will be particularly noted in FIG. 9, the second bracket portion 60 is at an angle with respect to the longitudinal axis 70 of the pivot shaft 50. The hinge pin 68 moves from a position in front of the axes 70, 82 with door closed (FIGS. 5 and 8) to a position over these axes when the door is opened (FIGS. 7 and 9). As a consequence, the hinge pin 68 will move to the left as viewed in the figures as the door 24 is pivoted from closed to open positions and to the right as the door is pivoted from the open to the closed position. This follows from the geometry shown. This leftward or rightward movement causes pressure to be exerted against the first bracket portion 58 via hinge pin 68 and thus against the entire remaining bracket including the outboard bracket structure 44. This occurs because, as will be recalled, the second portion 60 is fixedly attached to the crank shaft 72 and cannot move therealong. The outward bracket structure 44 is, however, free to slide on the pivot shaft 50 and does so as a consequence of the pressure exerted by the hinge pin 68 during opening or closing of the door 24. The pivot motion of the door is about fifty-eight angular degrees. This results in the desired simultaneous pivoting and sideways sliding of the outboard bracket structure 44 on the pivot shaft 50 and thus the desired pivoting and sideward movement of the door 24. As will be noted in FIGS. 4 and 6, the outboard bracket structure 44 moves back and forth between two positions depending upon whether the door 24 is open or closed. An enlarged head 94 is provided on the end of the pivot shaft 50 to prevent disengagement of the bracket structure 44 with the pivot shaft 50. The sideward movement on the pivot shaft 50 is accompanied by pivoting of the first portion 58 of the inboard bracket structure with respect to the second portion 60 via the hinge 66 with the result that the first and second portions 58, 60 are in alignment as shown in FIG. 9 when the door 24 is opened and are at the small angle previously referred to as shown in FIG. 5 when the door 24 is in the closed position.

We claim:

1. In a vehicle provided with front end body panel structure defining a pair of openings, a pair of headlights recessed in the openings, each opening being closed by a pivotable door when the headlights are turned off, the doors being pivotable to an open position when the headlights are turned on, the body panel structure including two sections each of which is angled rearwardly and outwardly from a point inboard of the outboard sides of the vehicle, one of the openings being provided in each of the sections, each opening and each door being configured in the general shape of a non-right angle parallelogram including non-vertical side edges which appear to be vertical when viewed from the front of the vehicle, the improvement comprising a door actuating mechanism for each door, each door actuating mechanism including inboard and outboard bracket structure extending rearwardly from each respective side edge of the door, a pivot shaft fixedly secured to the vehicle, the outboard bracket structure being pivotally and slidably mounted on the pivot shaft, the inboard bracket structure comprising first and second portions, the first portion being fixedly attached to the door, hinge means pivotally attaching the second portion to the first portion, the pivot axis of the hinge means being at substantially right angles to the longitudinal axis of the pivot shaft, a crank shaft fixedly attached to said second portion, the longitudinal axis of the crank shaft being angled downwardly with respect to the longitudinal axis of the pivot shaft in a vertical plane and angled forwardly with respect thereto in a horizontal plane, and drive means connected to the crankshaft for selectively rotating the crankshaft to open or close the door in a vertical direction with the door simultaneously a pivoting and sliding sideways on the pivot shaft to prevent engagement of the door with the side edges of the opening in the body panel structure during opening and closing of the door, the sideways sliding or the pivot shaft being accompanied by pivoting of the first portion of the inboard bracket structure with respect to the second portion via said hinge means.

2. Structure as defined in claim 1, further characterized in that the longitudinal axis of the pivot shaft when theoretically extended passes through the longitudinal axis of the crankshaft at substantially the juncture of the second portion of the inboard bracket structure and the crankshaft.

3. Structure as defined in claim 1, further characterized in that the first portion of the inboard bracket structure is angled in an outboard direction with respect to he second portion thereof when the door is in the closed position and is substantially in alignment therewith when the door is in the open position.

4. Structure as defined in claim 1, further characterized in that the longitudinal axis of the pivot shaft is angled downwardly about eight and one-quarter angular degrees with respect to the longitudinal axis of the pivot shaft in a vertical plane and angled about eleven angular degrees forwardly with respect thereto in a horizontal plane.

5. Structure as defined in claim 3, further characterized in that the first portion of the inboard bracket structure is angled in an outboard direction about seven angular degrees with respect to the second portion thereof.

* * * * *